(12) United States Patent
Krishna

(10) Patent No.: US 10,331,308 B2
(45) Date of Patent: Jun. 25, 2019

(54) ARRANGEMENT OF NATIVE APPLICATIONS ON A MOBILE DEVICE USER INTERFACE BASED ON USAGE PATTERNS

(71) Applicant: CA, INC., New York, NY (US)

(72) Inventor: Vikas Krishna, San Jose, CA (US)

(73) Assignee: CA, INC., New York, NY (US)

( * ) Notice: Subject to any disclaimer, the term of this patent is extended or adjusted under 35 U.S.C. 154(b) by 265 days.

(21) Appl. No.: 14/529,617

(22) Filed: Oct. 31, 2014

(65) Prior Publication Data

US 2016/0127203 A1    May 5, 2016

(51) Int. Cl.
| | |
|---|---|
| *G06F 3/0484* | (2013.01) |
| *G06F 3/0481* | (2013.01) |
| *G06F 3/041* | (2006.01) |
| *G06F 21/88* | (2013.01) |
| *G06F 9/451* | (2018.01) |
| *G06F 9/445* | (2018.01) |

(52) U.S. Cl.
CPC ............ *G06F 3/0484* (2013.01); *G06F 9/451* (2018.02); *G06F 21/88* (2013.01); *G06F 9/44505* (2013.01); *G06F 2221/031* (2013.01); *G06F 2221/2111* (2013.01); *G06F 2221/2135* (2013.01); *G06F 2221/2137* (2013.01)

(58) Field of Classification Search
None
See application file for complete search history.

(56) References Cited

U.S. PATENT DOCUMENTS

| | | | | |
|---|---|---|---|---|
| 8,823,667 | B1 * | 9/2014 | Hill | G06F 3/0482 345/173 |
| 2011/0289427 | A1 * | 11/2011 | Toprani | G06F 3/0488 715/746 |
| 2012/0331137 | A1 * | 12/2012 | Olsen | G06Q 30/02 709/224 |
| 2014/0013254 | A1 * | 1/2014 | Hosein | G06F 3/04817 715/765 |
| 2014/0195972 | A1 * | 7/2014 | Lee | G06F 3/04817 715/811 |
| 2014/0201655 | A1 * | 7/2014 | Mahaffey | G06F 3/04817 715/765 |

* cited by examiner

*Primary Examiner* — Nhat Huy T Nguyen
(74) *Attorney, Agent, or Firm* — Sage Patent Group

(57) ABSTRACT

A method includes performing operations as follows on a processor: detecting invocations of a plurality of native applications residing on a mobile device by a user through a user interface, determining usage patterns for the plurality of native applications based on the invocations by the user, and configuring the user interface to present the native applications for invocation based on the usage patterns that were determined.

17 Claims, 10 Drawing Sheets

US 10,331,308 B2

ARRANGEMENT OF NATIVE APPLICATIONS ON A MOBILE DEVICE USER INTERFACE BASED ON USAGE PATTERNS

BACKGROUND

The present disclosure relates to computing systems, and, in particular, to security management of mobile devices and improving productivity when using mobile devices and/or applications.

Enterprises have employees and/or customers that download applications onto their mobile devices, such as smart phones, tablets, laptops, and the like. These applications may allow the users to access various types of content and data belonging to the enterprise. Because mobile devices may be more susceptible to being stolen, misplaced, or compromised in some way, enterprises may deploy a set of security tools known as Mobile Application Management (MAM) or Enterprise Mobility Management (EMM) tools that may provide a security layer around the mobile applications. These MAM/EMM tools may be used to provide security functionality with respect to the mobile applications, the content accessed by the mobile applications, and/or the data used by the mobile applications. The MAM/EMM tools may implement rules and/or policies to ensure that the applications/content/data are secure. While such policies have a valid purpose in enhancing the security of mobile devices, the policies may in some instances be ill-defined and, as a result, place unnecessary burdens on users that negatively impact their productivity.

SUMMARY

In some embodiments of the inventive subject matter, a method comprises performing operations as follows on a processor: detecting invocations of a plurality of native applications residing on a mobile device by a user through a user interface, determining usage patterns for the plurality of native applications based on the invocations by the user, and configuring the user interface to present the native applications for invocation based on the usage patterns that were determined.

In still other embodiments of the inventive subject matter, a computer program product comprises a tangible computer readable storage medium comprising computer readable program code embodied in the medium that when executed by a processor causes the processor to perform operations comprising: detecting invocations of a plurality of native applications residing on a mobile device by a user through a user interface, determining usage patterns for the plurality of native applications based on the invocations by the user, and configuring the user interface to present the native applications for invocation based on the usage patterns that were determined.

In still further embodiments of the inventive subject matter, a system comprises a processor and a memory coupled to the processor and comprising computer readable program code embodied in the memory that when executed by the processor causes the processor to perform operations comprising: detecting invocations of a plurality of native applications residing on a mobile device by a user through a user interface, determining usage patterns for the plurality of native applications based on the invocations by the user, and configuring the user interface to present the native applications for invocation based on the usage patterns that were determined.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
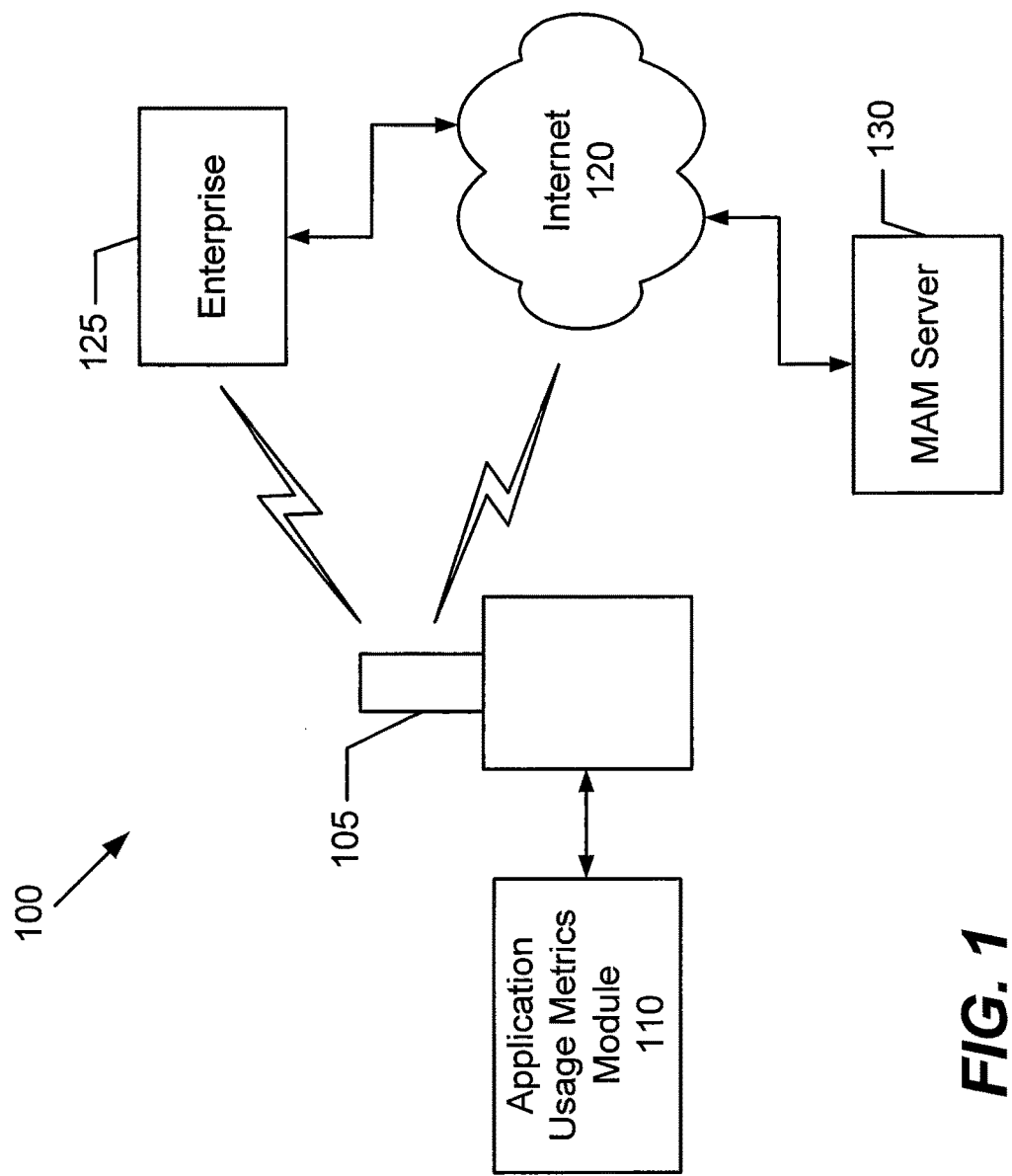
FIG. 1 is a block diagram of a communication network in which native applications are arranged on a mobile device user interface based on usage patterns in accordance with some embodiments of the inventive subject matter.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

Some embodiments of the inventive subject matter stem from a realization that a Mobile Application Management (MAM) client module on a mobile device may collect information on when and where native applications on the mobile device are used. The MAM client module may cooperate with other modules/applications, such as calendars, clocks, and/or navigation systems to associate the time, location, and/or event metric information with the native applications on the mobile device. The MAM client module may then detect time, geographic, and/or event patterns in the usage of the native applications on the mobile device and may then configure the mobile device's user interface so as to present the native applications for invocation based on the usage patterns.

FIG. 1 is a block diagram of a communication network in which native applications are arranged on a mobile device user interface based on usage patterns in accordance with some embodiments of the inventive subject matter. Employees and/or customers of an enterprise, for example, may use mobile devices, such as smart phones, tablets, laptops, and the like to access various types of content and data belonging to the enterprise. As shown in FIG. 1, a mobile device 105 may be used to communicate with an enterprise 125 (i.e., enterprise server(s)) using a direct wireless connection or via various networks, which are represented by the Internet 120.

Because mobile devices are typically more susceptible to being stolen, lost, or compromised versus desktop computing devices, the enterprise 125 may use Mobile Applications Management (MAM)/Enterprise Mobility Management (EMM) tools to provide additional security functionality with respect to the mobile applications, the content accessed by the mobile applications, and/or the data used by the mobile applications. As described above, the MAM/EMM tools may implement rules and/or policies to ensure that the enterprise's applications/content/data are secure by requiring enhanced login credentials depending on the time of day the application is being accessed (e.g., not during work hours), the geographic location of the mobile device, and the like. Content/data associated with the applications by enforcing various restrictions and policies that limit access to the content/data. While such MAM tools may lower user productivity in exchange for increasing security of a mobile device, additional MAM tools may be used to enhance user productivity according to some embodiments of the inventive subject matter.

A MAM server 140 may provide an application usage metrics module 110 that can be downloaded to the mobile device 105 either directly or, for example, through the enterprise 125. The application usage metrics module 110 may be configured to detect invocations of the native applications on the mobile device 105 and determine usage patterns for the native applications with respect to such metrics as date/time (year, month, day, time of day, etc.), geography, and/or event (e.g., events from a calendar application). The application usage metrics module 110 may be further configured to cooperate with a user interface module to configure the user interface such that the native applications are presented for invocation by a user based on the usage patterns for that the native applications that have been determined for the user.

As shown in FIG. 1, the connections between the enterprise server 125, MAM server 140, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for arranging native applications on a mobile device user interface based on usage patterns according to some embodiments of the inventive subject matter, it will be understood that embodiments of the present invention are not limited to such configurations, but are intended to encompass any configuration capable of carrying out the operations described herein.

Figure 2:
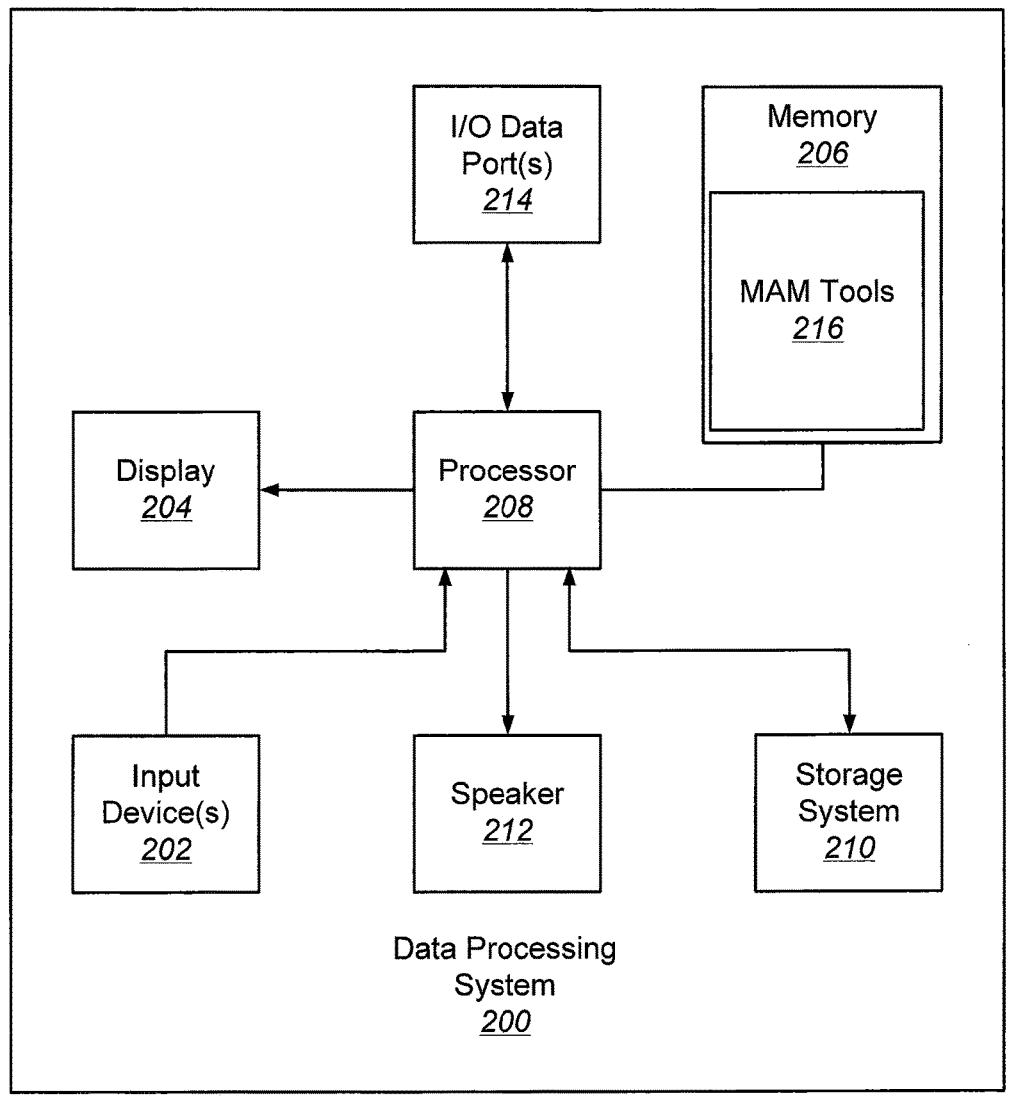
FIG. 2 illustrates a data processing system that may be used to implement the Mobile Applications Management (MAM) server of FIG. 1 in accordance with some embodiments of the inventive subject matter.

Referring now to FIG. 2, a data processing system 200 that may be used to implement the MAM server 140 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MAM tools module 216 that may be configured to provide one or more MAM tools, policies, rules, and the like—including a tool for arranging native applications on a mobile device user interface based on usage patterns—according to some embodiments of the inventive subject matter.

Figure 3:
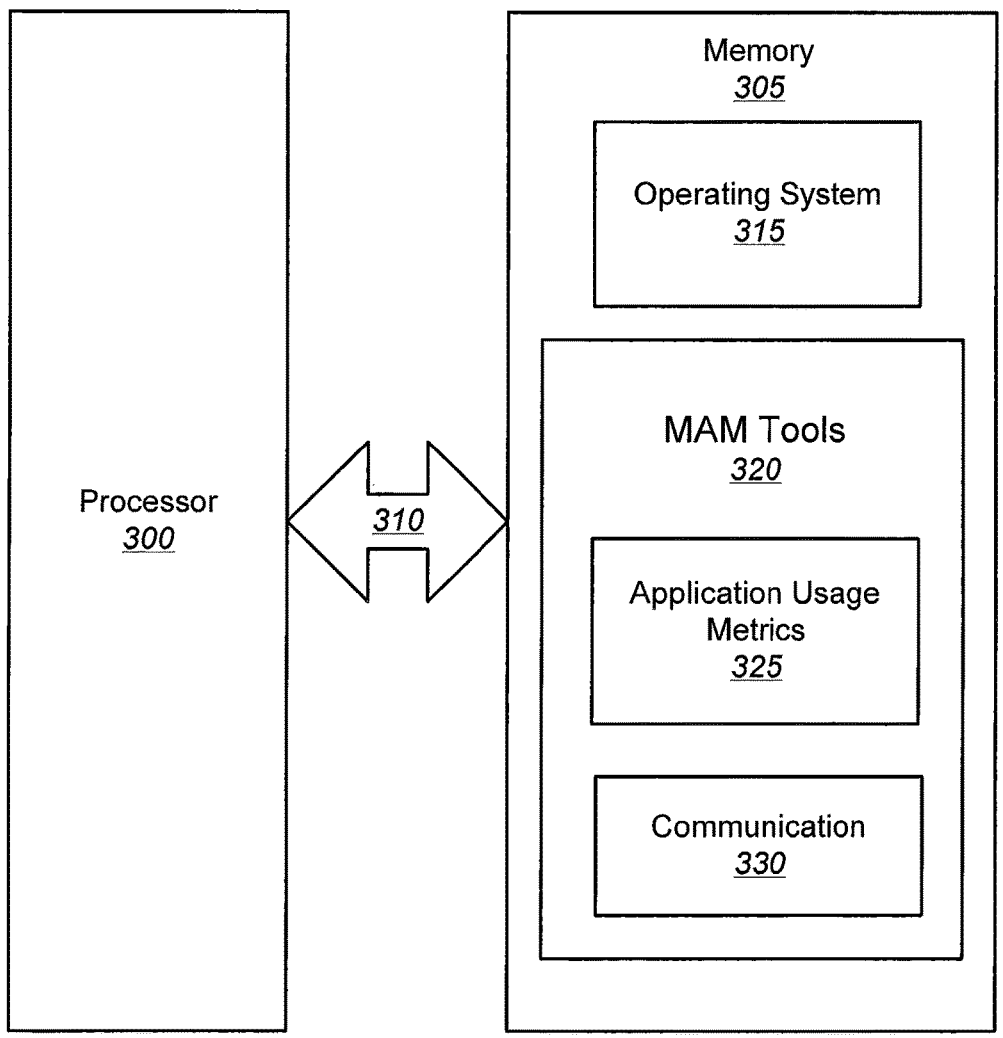
FIG. 3 is a block diagram that illustrates a software/hardware architecture for the MAM server of FIG. 1 in accordance with some embodiments of the present inventive subject matter.

FIG. 3 illustrates a processor 300 and memory 305 that may be used in embodiments of data processing systems, such as the MAM server 130 of FIG. 1 and the data processing system 200 of FIG. 2, respectively, for providing MAM tools, policies, rules, and the like to mobile devices, according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for providing MAM tools, policies, rules, and the like in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MAM tools module 320. The operating system 315 generally controls the operation of the data processing system. In particular, the operating system 315 may manage the data processing system's software and/or hardware resources and may coordinate execution of programs by the processor 300. The MAM tools module 320 may comprise an application usage metrics download module 325 and a communication module 330. The application usage metrics download module 325 may provide the application usage metrics module 110 shown in FIG. 1 that can be downloaded to a mobile device 105 either directly from the MAM server 130 or indirectly through the enterprise server 125, for example. The communication module 330 may be configured to facilitate communication between the MAM server 130 and other entities, such as the mobile device 105 and enterprise server 125.

Although FIG. 3 illustrates hardware/software architectures that may be used in data processing systems, such as the MAM server 130 of FIG. 1 and the data processing system 200 of FIG. 2, respectively, for providing MAM tools, policies, rules, and the like to mobile devices, according to some embodiments of the inventive subject matter, it will be understood that the present invention is not limited to such a configuration but is intended to encompass any configuration capable of carrying out operations described herein.

Figure 4:
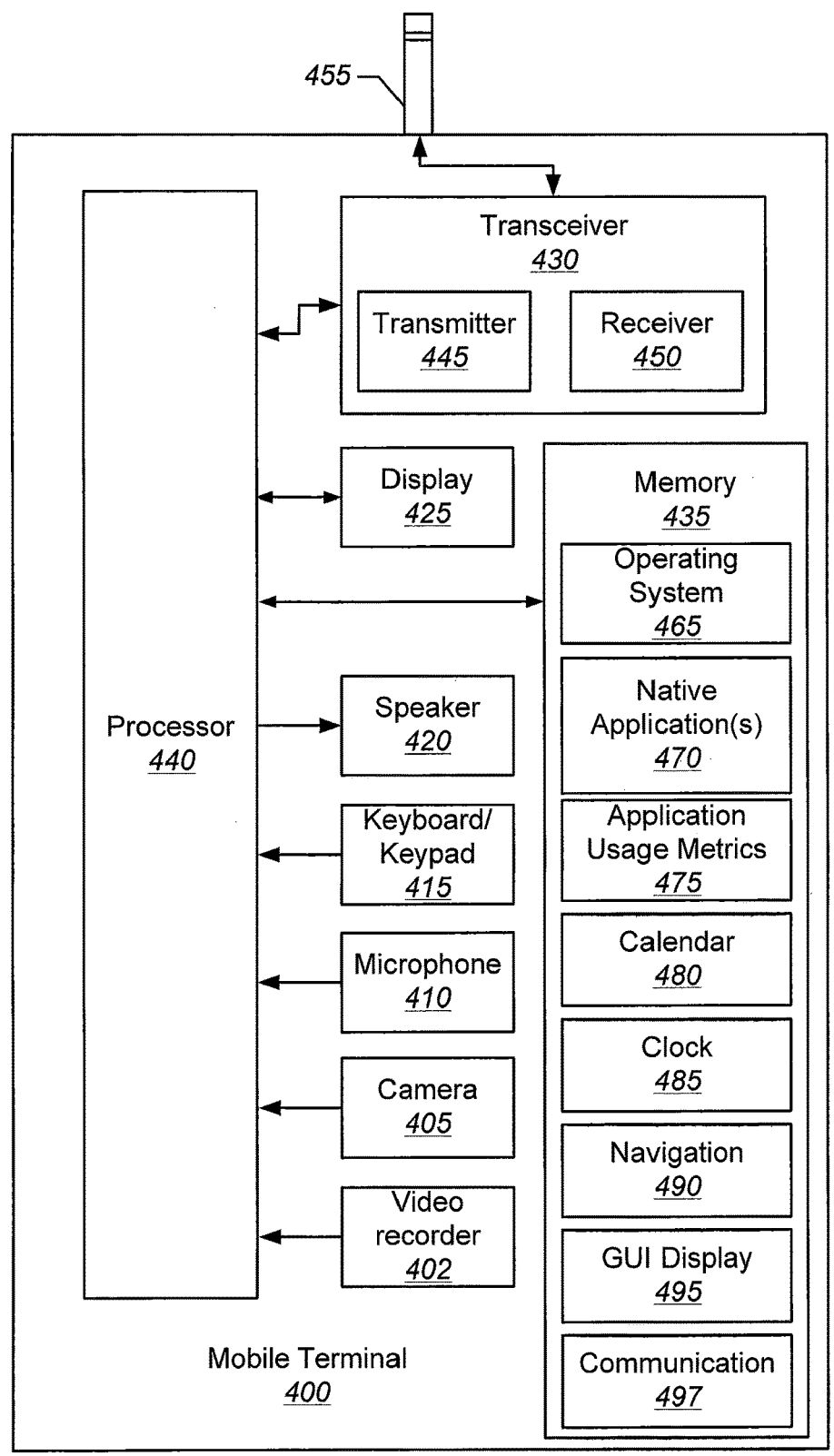
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminal 105 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to provide a phone-based Web server with a private IP address, in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to eight or more categories of software and/or data: the operating system 465, native application(s) 470, an application usage metrics module 475, a calendar module 480, a clock module 485, a navigation module 490, a Graphical User Interface (GUI) display module 495, and a communication module 497.

The operating system 465 generally controls the operation of the mobile terminal 400. In particular, the operating system 465 may manage the mobile terminal's software and/or hardware resources and may coordinate execution of programs by the processor 440.

The native application(s) 470 may represent those applications that are installed directly onto the mobile terminal 400. Users typically acquire these applications through online stores or marketplaces.

The application usage metrics module 475 may correspond to the application usage metrics module 110 of FIG. 1 and may be configured to detect invocations of the native applications 470 on the mobile terminal 400 and determine usage patterns for the native applications 470 with respect to such metrics as date/time (year, month, day, time of day, etc.), geography, and/or event (e.g., events from a calendar application). For example, the application usage metrics module 475 may communicate with the calendar module 480 to associate invocations of various native applications 470 by a user with events scheduled on the user's calendar 480. The application usage metrics module 475 may communicate with the clock module 485 to associate invocations of various native applications 470 by a user with time information from the clock module 485. The application usage metrics module 475 may use various granularities of time information from the clock module 485 including, but not limited to, year, month, day, AM, PM, hour, and minute. The application usage metrics module 475 may communicate with the navigation module 490 to associate invocations of various native applications 470 by a user with geographic information from the navigation module 490. The application usage metrics module 475 may use various granularities of geographic information from the navigation module 490 including, but not limited to, hemisphere, continent, nation, state, county, city/town, street/road, address, building, and Global Positioning System (GPS) coordinates.

The application usage metrics module 475 may be further configured to cooperate with the GUI display module 495 to configure the user interface such that the native applications 470 are presented for invocation by a user based on the usage patterns for that the native applications that have been determined for the user.

The communication module 497 may be configured to facilitate communication between the mobile terminal 105/400 and other entities, such as the enterprise server 125 and MAM server 130.

Although FIG. 4 illustrates an exemplary software and hardware architecture that may be used to provide a mobile terminal in which native applications are arranged on the mobile terminal user interface based on usage patterns according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MAM server 130, data processing system 200, hardware/software architecture of FIG. 3, and mobile device 105/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
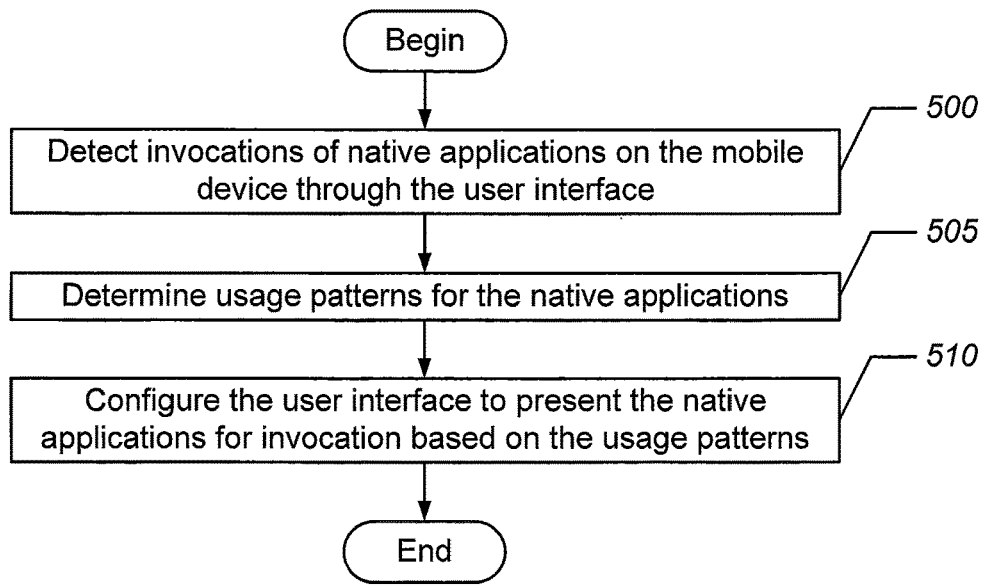
FIGS. 5 and 6 are flowcharts that illustrate operations for arranging native applications on a mobile device user interface based on usage patterns in accordance with some embodiments of the inventive subject matter.
Figure 6:
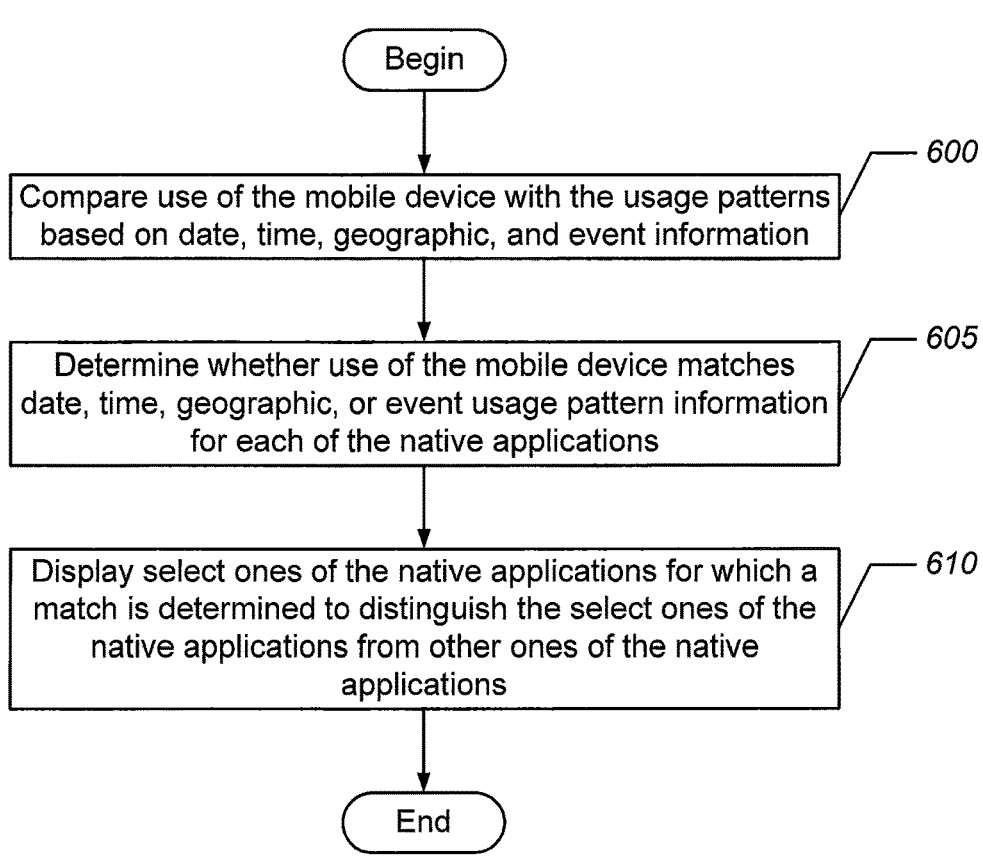
Figure 7A:
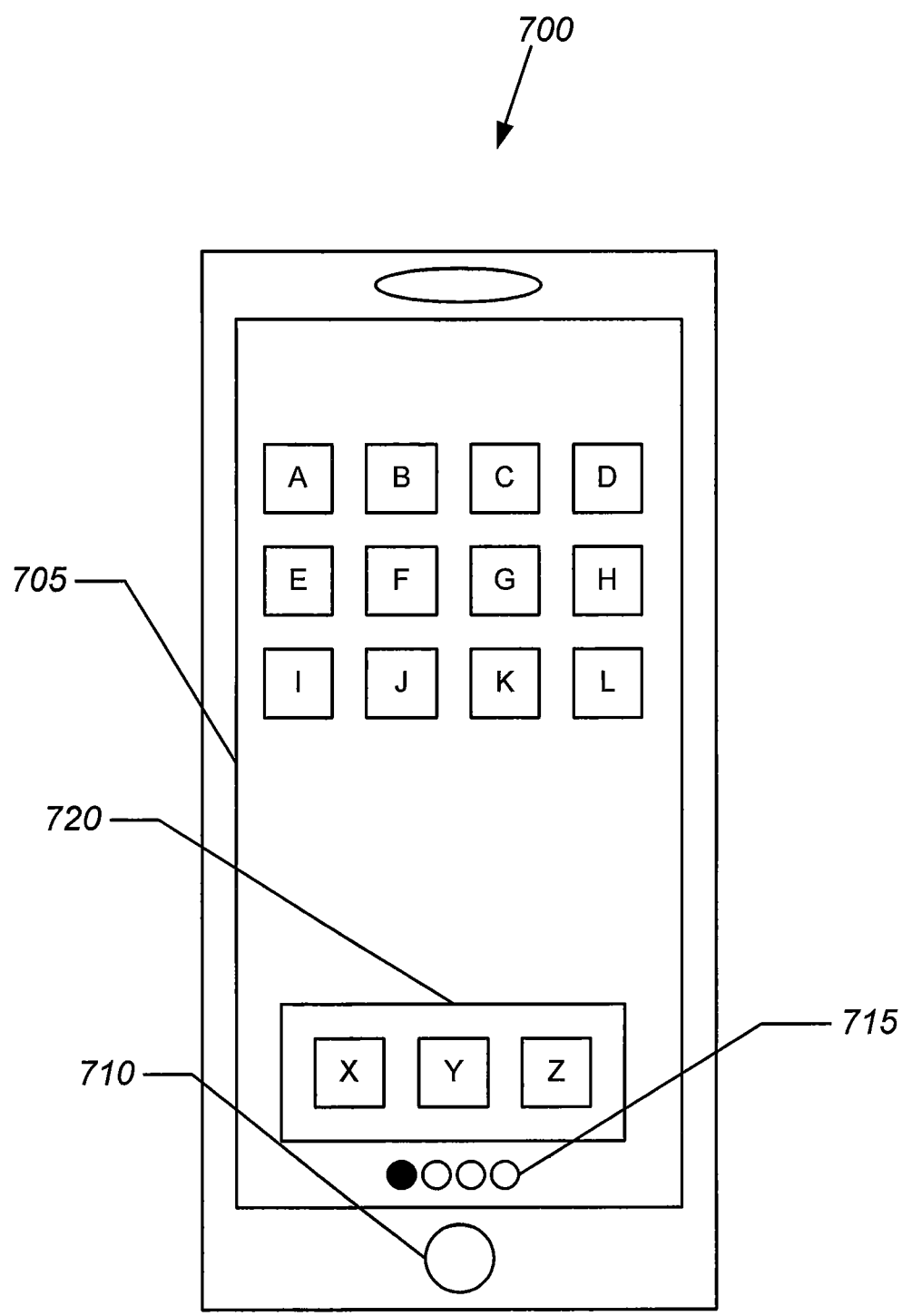
FIGS. 7A, 7B, and 8-10 are diagrams that illustrate arrangements of native applications on a mobile device user interface based on usage patterns in accordance with some embodiments of the inventive subject matter.
Figure 7B:
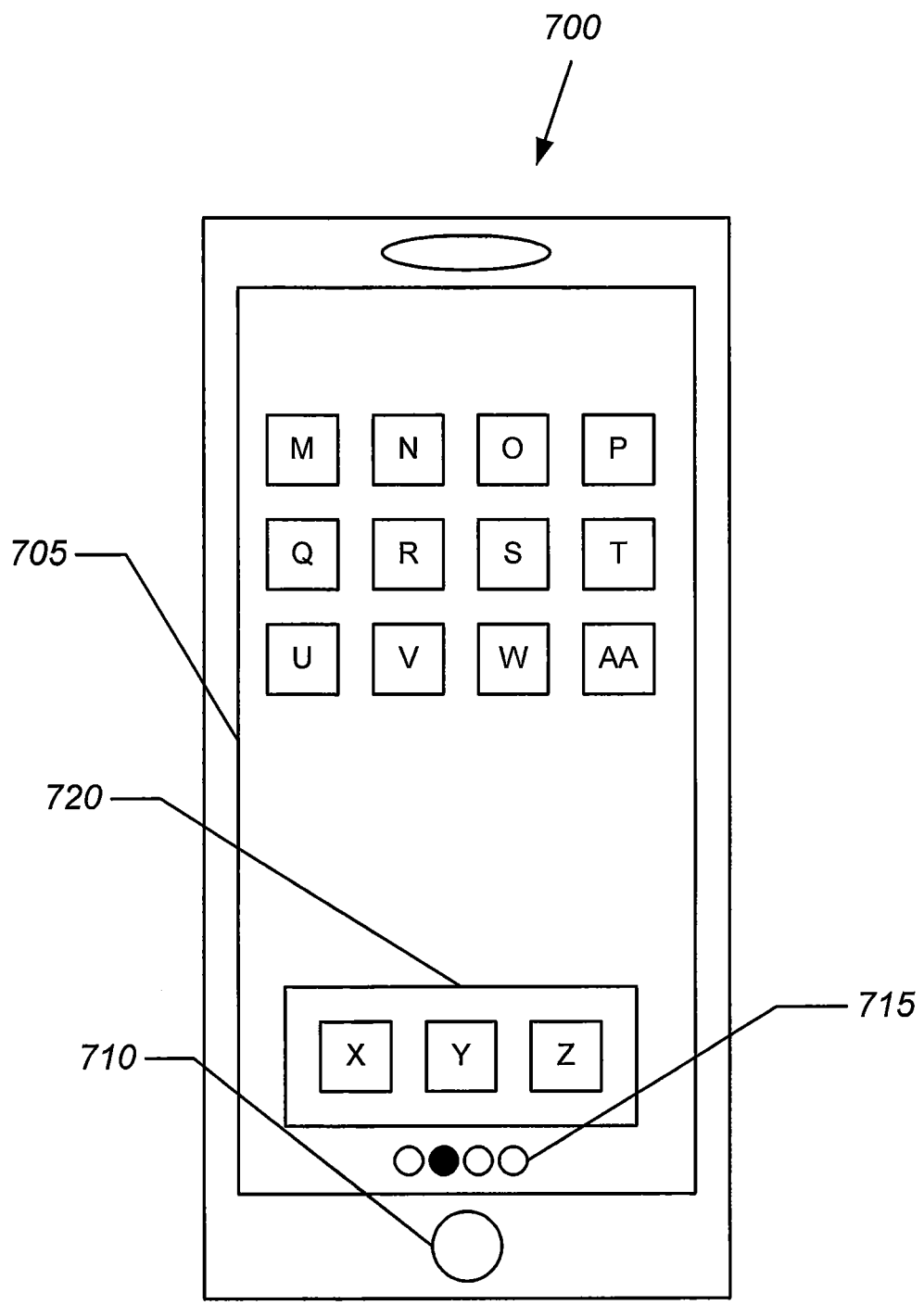

FIGS. 5 and 6 are flowcharts that illustrate operations for arranging native applications on a mobile device user interface based on usage patterns in accordance with some embodiments of the inventive subject matter. Referring now to FIG. 5, operations begin at block 500 where the application usage metrics module 475 detects invocations of native applications 470 on a mobile device 105/400 through the user interface 495. FIGS. 7A and 7B illustrate a user interface for a mobile device 700 according to some embodiments of the inventive subject matter. The mobile device comprises a display 705 on which thumbnail icons A through L (FIG. 7A) and M through AA (FIG. 7B) are used to represent native applications 470. The user interface comprises multiple pages as represented by the page icon 715 where the particular circle highlighted represents a particular page currently being displayed. In the example shown in FIGS. 7A and 7B, FIG. 7A shows page one on display and FIG. 7B shows page two on display. The mobile device 700 includes a home button 710 that can be invoked to return the user interface page one of the display 705, which may be considered a home page that the mobile device 700 displays when powered on or when awakened from a sleep or inactive state. The user interface may further include a static display portion 720, which remains displayed on all pages of the user interface. As shown in FIGS. 7A and 7B, icons corresponding to native applications X, Y, and Z are assigned to the static display portion 720 and are displayed on page one (FIG. 7A) and page two (FIG. 7B).

Returning to FIG. 5, the application usage metrics module 475 determines usage patterns for the native applications 470 at block 505 and associates the usage of the various native applications 470 with date information, time information, geographic information, and/or event information from the calendar module 480, the clock module 485, and the navigation module 490.

In addition to associating the usage of the various native applications 470 with date information, time information, geographic information, and/or event information as described above to determine usage patterns, other types of metrics can be used to establish usage patterns for the native applications 470. For example, the application usage metrics module 475 may collect measurements on the following types of application usage metrics: duration of user's use of an application program; level of user's interaction with an application program; specific features and/or sequence of features of an application that are used; how often specific features and/or sequence of features are used; number of features or levels of features of an application accessed or completed by a user; number of unsuccessful attempts by a user to complete a feature of an application program; events characterizing inefficient or ineffective operational use of an application program. The application usage metrics module 475 may also take into account an estimation of the age, gender, and/or another characteristic of the user based on a digital voice sample of the user via microphone, digital image data from a camera or video recorder, and/or personal data input by the user when evaluating usage patterns. This may be particularly useful when little usage pattern data is available and the application usage metrics module 475 provides a best guess prediction of which native applications a user may interact with the most in the future.

The application usage metrics module 475 then cooperates with the GUI display module 495 to configure the user interface of the mobile device 105/400 to present the native applications for invocation based on the usage patterns of the native applications by the user at block 510.

FIG. 6 illustrates operations for configuring the user interface of the mobile device 105/400 according to some embodiments of the inventive subject matter. Operations begin at block 600 where the application usage metrics module 475 compares use of the mobile device 105/400 with the usage patterns for the various native applications 470 based on date, time, geographic, and event information. A determination is made at block 605 whether use of the mobile device 105/400 matches any of the date, time, geographic, and event usage pattern information for each of the native applications 470. For example, a determination could be made that a user frequently uses a particular native application on Saturdays and today is Saturday. As another example, a determination could be made that a user frequently uses a particular native application at a workplace location and the navigation module 490 indicates the mobile terminal 105/400 is currently at the workplace location. At block 610, the application usage metrics module 475 cooperates with the GUI display module 495 to display select ones of the native applications 470 for which a match is determined at block 605 to distinguish the select ones of the native applications 470 from other ones of the native applications 470 on the user interface of the mobile device 105/400.

Figure 8:
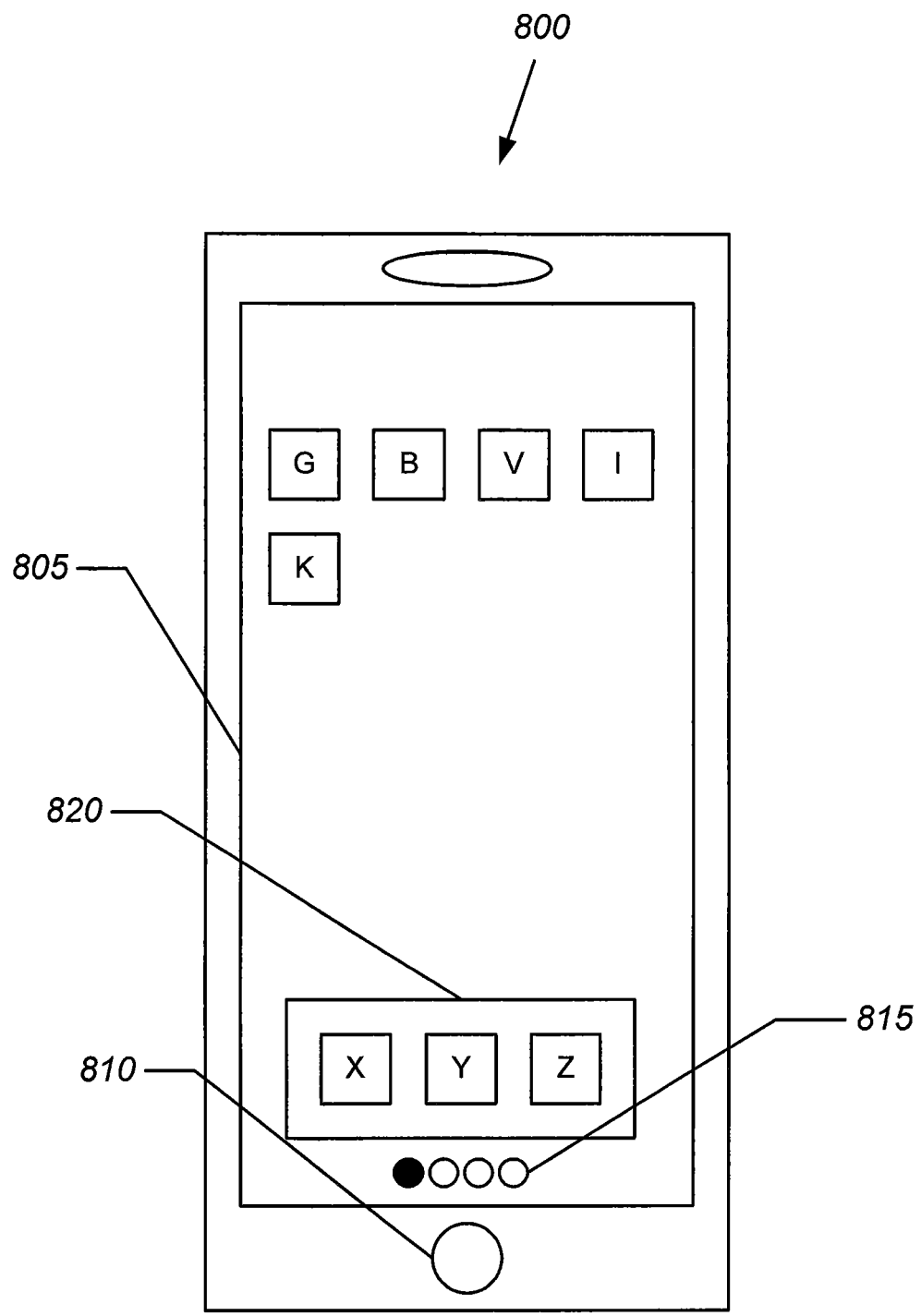
Figure 9:
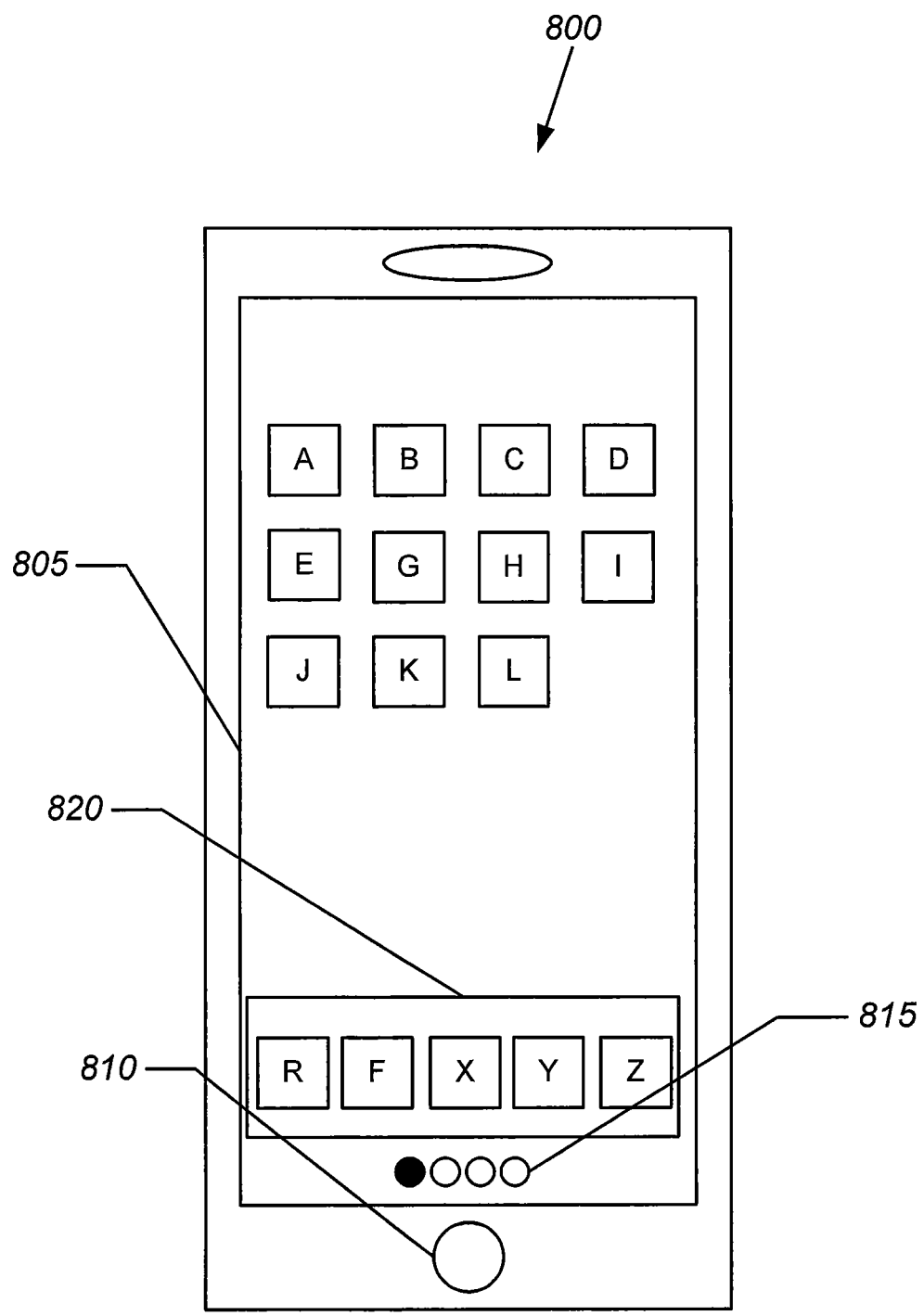
Figure 10:
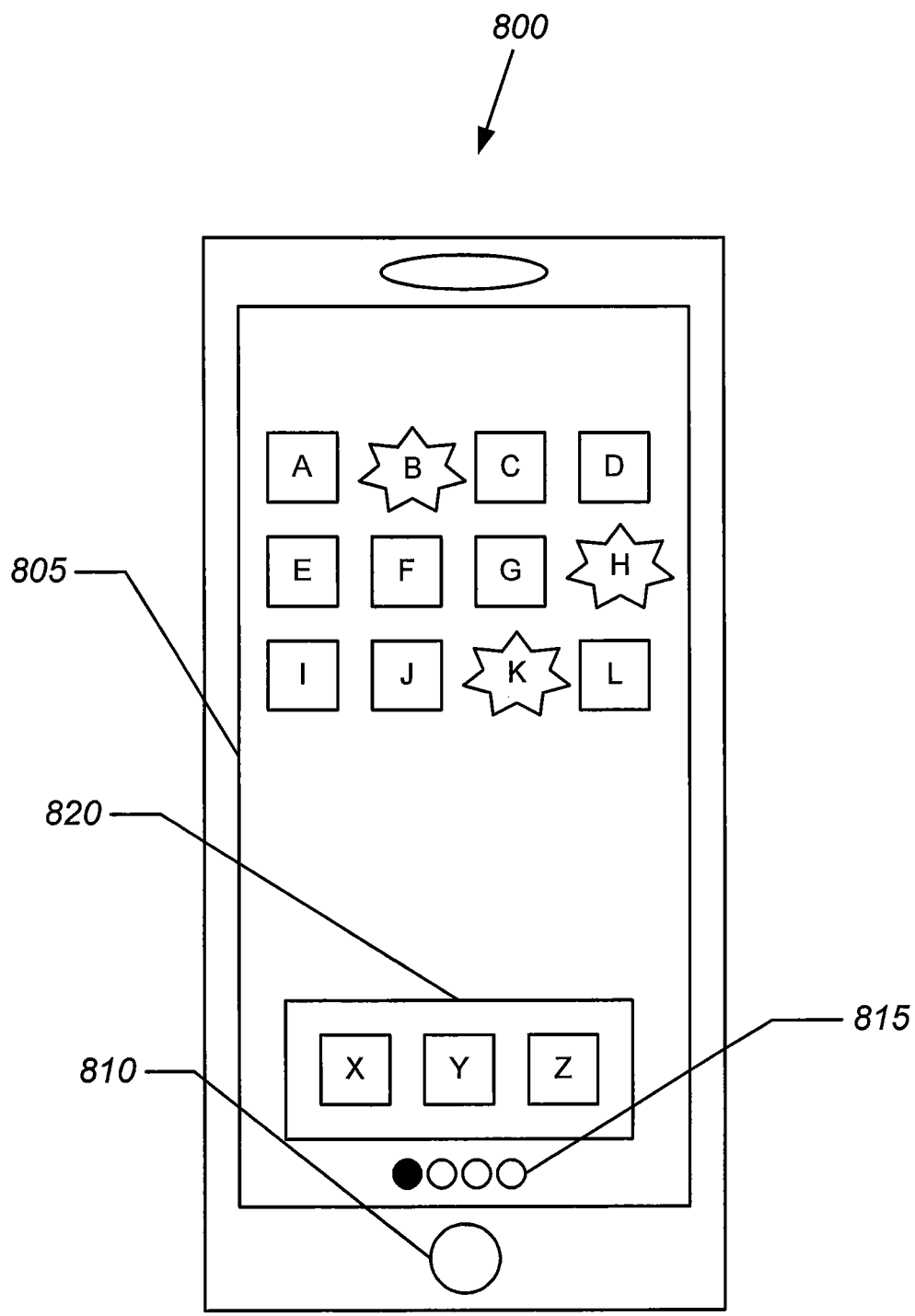

FIGS. 8-10 illustrate a user interface for a mobile device 800 in which native applications 470 are presented for invocation based on usage patterns according to some embodiments of the inventive concept. The display 805, home button 810, page icon 815, and static display portion 820 correspond to the display 705, home button 810, page icon 815, and static display portion 720 described above with respect to FIGS. 7A and 7B. As shown in FIG. 8, the application usage metrics module 475 has determined that the current use of the mobile device 800 with respect to date, time, geographic, and/or event information matches usage patterns determined for native applications G, B, V, I, and K. As a result, the application usage metrics module 475 has cooperated with the GUI display module 495 to reconfigure the user interface shown in FIG. 7A such that native applications G, B, V, I, and K are displayed on the home page of the user interface with other ones of the native applications moved to other pages of the user interface.

As shown in FIG. 9, the application usage metrics module 475 has determined that the current use of the mobile device 800 with respect to date, time, geographic, and/or event information matches usage patterns determined for native applications R and F. As a result, the application usage metrics module 475 has cooperated with the GUI display module 495 to reconfigure the user interface show in FIGS. 7A and 7B such that native application R has been moved from the second page (FIG. 7B) and moved to the static display portion 820 and native application F has been moved from the first page (FIG. 7A) to the static display portion 820.

As shown in FIG. 10, the application usage metrics module 475 has determined that the current use of the mobile device 800 with respect to date, time, geographic, and/or event information matches usage patterns determined for native applications B, H, and K. As a result, the application usage metrics module 475 has cooperated with the GUI display module 495 to reconfigure the user interface show in FIG. 7A such that icons native applications B, H, and K have been modified to be in a star format. It will be understood that various other formats can be used to distinguish the icons for B, H, and K with respect to changing their color, shape, size, etc. so as to distinguish these native applications 470 from other ones of the native applications 470.

It will be understood that the various techniques described above with respect to FIGS. 8-10 to distinguish particular native applications 470 from other ones of the native applications 470 because current usage of the mobile device 105/400 matches usage patterns for these particular native applications 470 can be combined. For example, a native application icon could be moved to the home page of the display (FIG. 8) and also be modified such that the icon has a different shape than other icons for the native applications 470.

Through use of an application usage metrics module on a mobile device according to some embodiments of the inventive subject matter, native applications may be arranged based on usage patterns. This may provide a mobile device that operates more efficiently as native applications that a user has a greater likelihood to access are presented through the user interface in a fashion that makes it easier for the user to find and invoke the applications. As a result, the user may be more productive, and processing time spent searching for a particular application through the user interface may be reduced. The reduction in time searching for particular applications may also result in improved battery usage by increasing the interval between recharging sessions.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
    performing operations as follows by a processor:
        detecting invocations of a plurality of native applications residing on a mobile device by a user through a user interface, the native applications comprising applications acquired by the user and installed on the mobile device based upon user input;
        determining usage patterns for the plurality of native applications based on the invocations by the user;
        receiving human characteristic information from the user;
        estimating an age of the user and a gender of the user based on the human characteristic information;
        configuring the user interface to present the native applications for invocation based on the usage patterns that were determined and one of the age of the user and the gender of the user;
        wherein the user interface comprises a plurality of pages and wherein configuring the user interface to present the native applications for invocation comprises:
            comparing use of the mobile device with the usage patterns for the plurality of native applications based on date information, time information, geographic information, and event information;
            determining whether use of the mobile device matches one of the date information, time information, geographic information, and event information for respective ones of the plurality of native applications; and
            displaying select ones of the plurality of native applications on a home page of the plurality of pages for which the use of the mobile device is determined to match one of the date information, time information, geographic information, and event information for the select ones of the plurality of native applications;
        wherein the user interface comprises a static display portion that is displayed on each of the plurality of pages, the method further comprising:
            displaying the select ones of the plurality of native applications on the static display for which the use of the mobile device is determined to match one of the date information, time information, geographic information, and event information for the select ones of the plurality of native applications, wherein each of the select ones of the plurality of native applications on the static display are displayed at a same location on the static display portion on each of the plurality of pages; and
            reconfiguring the user interface to add a first native application to be displayed on the static display, the first native application being added to the static display based on a current use of the mobile device with respect to one of: date, time, geographic and event being determined to match one of the date information, time information, geographic information, and event information for the first native application, the event information comprising information on events scheduled on a calendar module used by the user.

2. The method of claim 1, wherein determining usage patterns for the plurality of native applications comprises:
associating the invocations of the plurality of native applications with days of a year obtained from a clock module, respectively.

3. The method of claim 1, wherein determining usage patterns for the plurality of native applications comprises:
associating the invocations of the plurality of native applications with times of a day obtained from a clock module, respectively.

4. The method of claim 1, wherein determining usage patterns for the plurality of native applications comprises:
associating the invocations of the plurality of native applications with event information obtained from the calendar module, respectively.

5. The method of claim 1, wherein determining usage patterns for the plurality of native applications comprises:
associating the invocations of the plurality of native applications with geographic information obtained from a navigation module, respectively.

6. The method of claim 1, wherein determining the usage patterns for the plurality of native applications comprises:
determining the usage patterns for the plurality of native applications based on date information, time information, geographic information, event information, duration of use for respective ones of the plurality of native applications, feature usage for respective ones of the plurality of native applications, and unsuccessful attempts to use respective ones of the plurality of native applications.

7. The method of claim 6, further comprising:
comparing use of the mobile device with the usage patterns for the plurality of native applications based on date information, time information, geographic information, and event information;
determining whether use of the mobile device matches one of the date information, time information, geographic information, and event information for respective ones of the plurality of native applications; and
displaying select ones of the plurality of native applications for which the use of the mobile device is determined to match one of the date information, time information, geographic information, and event information for the select ones of the plurality of native applications using an icon format that is different than other ones of the plurality of native applications.

8. The method of claim 1 wherein the first native application being added to the static display is on a page that is not presently displayed and reconfiguring the user interface to add the first native application to be displayed on the static display comprising adding the first native application to the static display without displaying the page that is not presently displayed.

9. A computer program product, comprising:
a non-transitory computer readable storage medium comprising computer readable program code embodied in the medium that when executed by a processor causes the processor to perform operations comprising:
detecting invocations of a plurality of native applications residing on a mobile device by a user through a user interface, the native applications comprising applications acquired by the user and installed on the mobile device based upon user input;
determining usage patterns for the plurality of native applications based on the invocations by the user;
receiving human characteristic information from the user;
estimating an age of the user and a gender of the user based on the human characteristic information;
configuring the user interface to present the native applications for invocation based on the usage patterns that were determined and one of the age of the user and the gender of the user;
wherein the user interface comprises a plurality of pages and wherein configuring the user interface to present the native applications for invocation comprises:
comparing use of the mobile device with the usage patterns for the plurality of native applications based on date information, time information, geographic information, and event information;
determining whether use of the mobile device matches one of the date information, time information, geographic information, and event information for respective ones of the plurality of native applications; and
displaying select ones of the plurality of native applications on a home page of the plurality of pages for which the use of the mobile device is determined to match one of the date information, time information, geographic information, and event information for the select ones of the plurality of native applications;
wherein the user interface comprises a static display portion that is displayed on each of the plurality of pages, the operations further comprising:
displaying the select ones of the plurality of native applications on the static display for which the use of the mobile device is determined to match one of the date information, time information, geographic information, and event information for the select ones of the plurality of native applications, wherein each of the select ones of the plurality of native applications on the static display are displayed at a same location on the static display on each of the plurality of pages; and
reconfiguring the user interface add a first native application to be displayed on the static display, the first native application being added to the static display based on a current use of the mobile device with respect to one of: date, time, geographic and event being determined to match one of the date information, time information, geographic information, and event information for the first native application, the event information comprising information on events scheduled on a calendar module used by the user.

10. The computer program product of claim 9, wherein determining usage patterns for the plurality of native applications comprises:
associating the invocations of the plurality of native applications with days of a year obtained from a clock module, respectively.

11. The computer program product of claim 9, wherein determining usage patterns for the plurality of native applications comprises:
associating the invocations of the plurality of native applications with times of a day obtained from a clock module, respectively.

12. The computer program product of claim 9, wherein determining usage patterns for the plurality of native applications comprises:

associating the invocations of the plurality of native applications with event information obtained from a calendar module, respectively.

13. The computer program product of claim 9, wherein determining usage patterns for the plurality of native applications comprises:
   associating the invocations of the plurality of native applications with geographic information obtained from a navigation module, respectively.

14. The computer program product of claim 9, wherein determining the usage patterns for the plurality of native applications comprises:
   determining the usage patterns for the plurality of native applications based on date information, time information, geographic information, event information, duration of use for respective ones of the plurality of native applications, feature usage for respective ones of the plurality of native applications, and unsuccessful attempts to use respective ones of the plurality of native applications.

15. The computer program product of claim 14, wherein the operations further comprise:
   comparing use of the mobile device with the usage patterns for the plurality of native applications based on date information, time information, geographic information, and event information;
   determining whether use of the mobile device matches one of the date information, time information, geographic information, and event information for respective ones of the plurality of native applications; and
   displaying select ones of the plurality of native applications for which the use of the mobile device is determined to match one of the date information, time information, geographic information, and event information for the select ones of the plurality of native applications using an icon format that is different than other ones of the plurality of native applications.

16. A system, comprising:
   a processor; and
   a memory coupled to the processor and comprising computer readable program code embodied in the memory that when executed by the processor causes the processor to perform operations comprising:
   detecting invocations of a plurality of native applications residing on a mobile device by a user through a user interface, the native applications comprising applications acquired by the user and installed on the mobile device based upon user input;
   determining usage patterns for the plurality of native applications based on the invocations by the user;
   receiving human characteristic information from the user;
   estimating an age of the user and a gender of the user based on the human characteristic information;
   configuring the user interface to present the native applications for invocation based on the usage patterns that were determined and one of the age of the user and the gender of the user;
   wherein the user interface comprises a plurality of pages and wherein configuring the user interface to present the native applications for invocation comprises:
      comparing use of the mobile device with the usage patterns for the plurality of native applications based on date information, time information, geographic information, and event information;
      determining whether use of the mobile device matches one of the date information, time information, geographic information, and event information for respective ones of the plurality of native applications; and
      displaying select ones of the plurality of native applications on a home page of the plurality of pages for which the use of the mobile device is determined to match one of the date information, time information, geographic information, and event information for the select ones of the plurality of native applications;
   wherein the user interface comprises a static display portion that is displayed on each of the plurality of pages, the operations further comprising:
      displaying the select ones of the plurality of native applications on the static display for which the use of the mobile device is determined to match one of the date information, time information, geographic information, and event information for the select ones of the plurality of native applications, wherein each of the select ones of the plurality of native applications on the static display are displayed at a same location on the static display portion on each of the plurality of pages; and
      reconfiguring the user interface to add a first native application to be displayed on the static display, the first native application being added to the static display based on a current use of the mobile device with respect to one of: date, time, geographic and event being determined to match one of the date information, time information, geographic information, and event information for the first native application, the event information comprising information on events scheduled on a calendar module used by the user.

17. The system of claim 16, wherein determining the usage patterns for the plurality of native applications comprises:
   determining the usage patterns for the plurality of native applications based on date information, time information, geographic information, event information, duration of use for respective ones of the plurality of native applications, feature usage for respective ones of the plurality of native applications, and unsuccessful attempts to use respective ones of the plurality of native applications.

* * * * *